Feb. 25, 1941.     C. G. HAWLEY     2,233,079
CENTRIFUGAL TUYÈRE
Filed March 16, 1938

INVENTOR
CHARLES G. HAWLEY
BY Mason & Mason
ATTORNEYS

Patented Feb. 25, 1941

2,233,079

UNITED STATES PATENT OFFICE 2,233,079

CENTRIFUGAL TUYÈRE

Charles Gilbert Hawley, Cleveland, Ohio; Hope Hawley Degenhardt and Virginia Taylor Hawley, executrices of said Charles Gilbert Hawley, deceased, assignor, by mesne assignments, to Centrifix Corporation, Cleveland, Ohio, a corporation of Ohio Application March 16, 1938, Serial No. 196,302

4 Claims. (Cl. 183—82)

The invention relates to improvements in so-called centrifugal tuyères, to the end that they shall be more efficient.

A tuyère is an element which serves as an avenue through which aeriform fluid passes from one chamber, or space, to another. A centrifugal tuyère is a device used to set the fluid into rotative action and such rotation is depended upon to perform services of various sort. A tuyère is thus definitely differentiated from a mere separating chamber.

Such a tuyère comprises a circumferential series of tangentially positioned and generally parallel spaced blades together defining and encircling an inner and generally cylindrical space. One end of that space is closed. The other end is partially or wholly open; serving as the tuyère outlet. As will be apparent the tangential blades form an equal number of long narrow slots or fluid passes, called tuyère openings. An aeriform fluid entering such openings from the outside necessarily takes on a whirling movement within the central cylindrical space.

In many cases such fluid so enters from the outside and conveys and introduces into said central space particles of dust or of liquid. The whirling action described serves to centrifugally separate them, and the fluid leaving the open end of the tuyère spirally conveys the separated matters, and centrifugally ejects them from said open end.

In other cases the lower part of said tuyère is flooded or otherwise supplied with liquid and the entering aeriform fluid, whirling within the tuyère, serves to continuously break the liquid into fine particles and to erect within the tuyère a foraminous wall of liquid particles spiraling toward the outlet and through which centrifugally and centripetally maintained wall the continuing fluid must pass. This is a method of ensuring intimate contact between such fluid and the liquid; as practiced in my so-called process of stabilizing sewage and the like.

The object of this invention is to provide an improved tuyère wherein and whereby the whirling motion may be and is accentuated in that end of the tuyère structure which has been referred to as closed. As will be explained, several gains are made by thus augmenting the whirling action at the wholly or partially closed end of the tuyère.

It may be here mentioned that the end closure may be complete or may contain a central opening, according to the use to which the tuyère is to be put.

Figure 1:
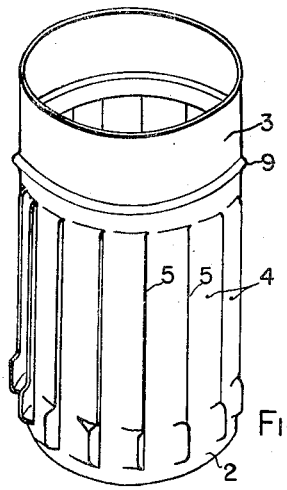
Figure 2:
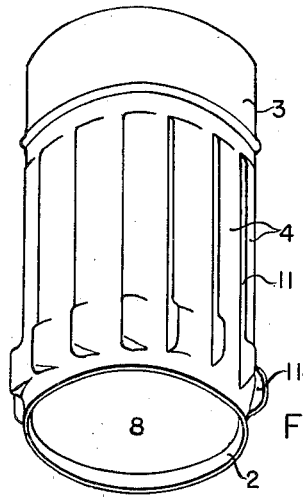
Figure 3:
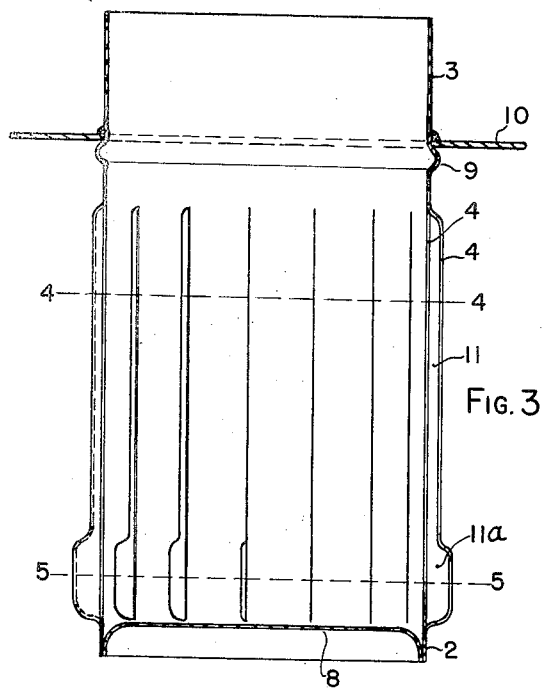
Figure 4:
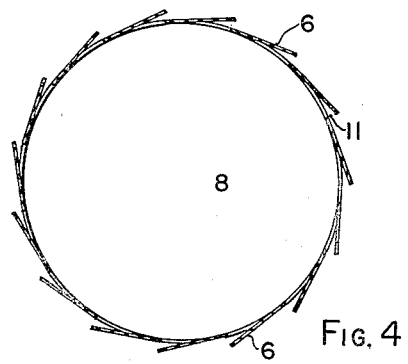
Figure 5:
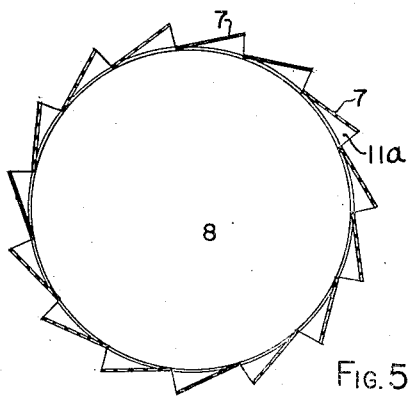
Figure 6:
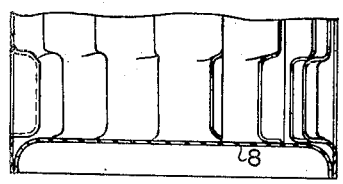

The invention will be readily understood upon reference to the accompanying drawing; in which—Fig. 1 is a perspective view of the novel tuyère; Fig. 2 is another perspective view showing tuyère openings oppositely directed, and also disclosing the closed bottom of the tuyère; Fig. 3 is an enlarged vertical section of the novel tuyère, better depicting the preferred formation of the invention; Fig. 4 is a cross section on the line 4—4 of Fig. 3; Fig. 5 is a cross section on the line 5—5 of Fig. 3; and, Fig. 6 illustrates a modified form of the tuyère.

These tuyères may be variously formed and may be constructed of many parts, properly shaped and connected. But, by preference, the centrifugal tuyère, or tuyère unit, is constructed of relatively thin and light sheet metal wherein the described tuyère blades are made by shearing and forming operations. Attention is specially directed to tuyères which are so made.

These tuyères are generally positioned upon vertical axes, are closed at the bottom and are open at the top. Herein they will be so described; though it will become apparent that any given tuyère may be applied in any desired position.

Each tuyère of preferred form comprises a thin walled cylindrical body marked or characterized by a narrow imperforate bottom portion 2, and a, usually higher or wider, imperforate top portion 3; and, those end parts being joined by a longer intermediate portion which is divided into a plurality of longitudinally sheared and laterally formed blades 4.

The blades are all the same and are formed by shearing the sheet upon longitudinal lines 5, after which the severed strips are pressed and shaped so that they become tangentially disposed to the cylindrical body, as clearly shown at points 6 and 7 in Figs. 4 and 5. The formation or "pressing" of the blades completes the tuyère openings before mentioned. The bottom closure is marked 8.

These shearing and punching operations are generally performed upon the sheet of metal before the sheet is rolled into cylindrical form, but an initially cylindrical body portion may be accepted and the shearing and punching operations may be performed thereon to produce the described tangentially blade portions.

In many cases the body thus completed, in addition to the closure 8, will be provided with indentations or a rib 9 made in the neck portion 3 to serve as a stop or guide when the tuyère is fastened into a dividing wall floor or partition, such as the part marked 10.

As a rule the blades 4 will project outward from the body of the tuyère as shown in Figs. 1 to 5, but, as shown in Fig. 6, the blades may project within the body of the tuyère.

Present novelty resides in the making of tuyère openings 11 which are wider at the bottom or closure end than at the top or open end. In the main each opening is narrow but at the bottom is widened to form a more capacious tuyère opening 11a. These distended portions are secured by shaping the forming dies accordingly and in themselves are very simple, but markedly different operating results are thereby secured from the tuyère.

The definitely enlarged openings adjacent to closed end 8, so to speak, admit thicker or more powerful streams of fluid, with the result that the whirling action in the bottom or closed end of the tuyère is accordingly increased.

Further, the tuyère openings which are thus enlarged by the distention of the normal blades 4 are of distinct convenience when liquid is to be directly flooded into the tuyère to and upon the bottom 8. In such cases, the air or other fluid entering through the tuyère openings abruptly agitates the liquid within the bottom of the tuyère and causes its pulverization i. e. atomization, to an extent which enables the thinner normal streams to lift the liquid spirally within the tuyère.

The accentuated bottom action here described is the same when liquid or solid particles are carried into the tuyère by the aeriform fluid and remains the same whether the tuyère is used in reversed vertical position or in horizontal or inclined position.

Having thus described my invention, I claim as new and desire to secure by Letters Patent:

1. The new article of manufacture comprising a thin walled cylindrical tuyère body having a closure at one end only and longitudinally sheared, the sheared portions of said body being pressed to form tangential tuyère openings which are widest adjacent said closure.

2. A centrifugal tuyère as claimed in claim 1 and characterized by tangential tuyère openings which are abruptly enlarged adjacent said closure.

3. A centrifugal tuyère adapted to the uses herein defined and comprising a thin walled metal tube presenting imperforate end portions and a body portion composed of longitudinally extended tangential blade portions which connect said end portions, each pair of said blade portions forming a slot-like tangential tuyère opening of uniform width for the major part of its length and abruptly widened for a minor part of its length adjacent one of said imperforate end portions.

4. The new article of manufacture as claimed in claim 3, characterized by a bottom or end closure held in the tube at the end containing the widened openings.

CHARLES GILBERT HAWLEY.